US009460493B2

(12) United States Patent
Suri et al.

(10) Patent No.: US 9,460,493 B2
(45) Date of Patent: Oct. 4, 2016

(54) AUTOMATIC VIDEO QUALITY ENHANCEMENT WITH TEMPORAL SMOOTHING AND USER OVERRIDE

(71) Applicant: Microsoft Corporation, Redmond, WA (US)

(72) Inventors: Nitin Suri, Redmond, WA (US); Andrew Shaun Ivory, Woodinville, WA (US); Tzong-Jhy Wang, Seattle, WA (US); Bruce Justin Lindbloom, Eden Prairie, MN (US); William David Sproule, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/304,911

(22) Filed: Jun. 14, 2014

(65) Prior Publication Data
US 2015/0363919 A1    Dec. 17, 2015

(51) Int. Cl.
*G06K 9/40* (2006.01)
*G06T 5/00* (2006.01)
*G06T 5/40* (2006.01)
*G06T 5/50* (2006.01)

(52) U.S. Cl.
CPC ............... *G06T 5/002* (2013.01); *G06T 5/009* (2013.01); *G06T 5/40* (2013.01); *G06T 5/50* (2013.01); *G06T 2207/10016* (2013.01); *G06T 2207/20004* (2013.01); *G06T 2207/20072* (2013.01); *G06T 2207/20092* (2013.01); *G06T 2207/20182* (2013.01)

(58) Field of Classification Search
USPC .......... 382/254, 264, 236, 233, 172; 381/56, 381/110; 375/E7.281, 240.03, 240.12; 704/219, 207, 208, 217, 222, 233, 228, 704/230, E19.04, 500
See application file for complete search history.

(56) References Cited

U.S. PATENT DOCUMENTS

| 4,868,653 | A | * | 9/1989 | Golin et al. ............. 375/240.23 |
| 5,475,425 | A | | 12/1995 | Przyborski |
| 5,544,258 | A | | 8/1996 | Levien |

(Continued)

FOREIGN PATENT DOCUMENTS

| EP | 1965389 A2 | 9/2008 |
| EP | 2 096 577 A2 | 9/2009 |

(Continued)

OTHER PUBLICATIONS

Choudhury, et al., "A Framework for Robust Online Video Contrast Enhancement Using Modularity Optimization", In IEEE Transactions on Circuits and Systems for Video Technology, vol. 22 , Issue: 9, Sep. 2012, 14 pages.
"Interest Point Detection", Retrieved on: Apr. 21, 2014, Available at: http://en.wikipedia.org/wiki/Interest_point_detection.
"International Search Report & Written Opinion Issued in PCT Application No. PCT/US2015/036595", Mailed Date: Sep. 24, 2015, 10 Pages.

(Continued)

*Primary Examiner* — Anh Do
(74) *Attorney, Agent, or Firm* — Dan Choi; Bryan Webster; Micky Minhas

(57) ABSTRACT

Technologies for a single-pass process for enhancing video quality with temporal smoothing. The process may include providing for user overrides of automatically enhanced video/frame characteristics and providing substantially immediate previews of enhanced video frames to a user. The process may also include detecting a degree of shakiness in a portion of the video, and performing or recommending stabilization based on the detected shakiness.

20 Claims, 9 Drawing Sheets

(56) References Cited

U.S. PATENT DOCUMENTS

| | | | |
|---|---|---|---|
| 5,687,011 A | 11/1997 | Mowry | |
| 6,028,960 A | 2/2000 | Graf | |
| 6,283,858 B1 | 9/2001 | Hayes, Jr. | |
| 6,297,825 B1 | 10/2001 | Madden et al. | |
| 6,389,181 B2 | 5/2002 | Shaffer | |
| 6,757,027 B1 | 6/2004 | Edwards et al. | |
| 7,082,211 B2 | 7/2006 | Simon | |
| 7,194,114 B2 | 3/2007 | Schneiderman | |
| 7,200,561 B2* | 4/2007 | Moriya et al. | 704/500 |
| 7,337,112 B2* | 2/2008 | Moriya et al. | 704/228 |
| 7,551,754 B2 | 6/2009 | Steinberg | |
| 7,577,295 B2 | 8/2009 | Constantin | |
| 7,577,297 B2 | 8/2009 | Mori | |
| 7,580,952 B2 | 8/2009 | Logan | |
| 7,639,877 B2 | 12/2009 | Shiota | |
| 7,680,327 B2 | 3/2010 | Weiss | |
| 7,715,598 B2 | 5/2010 | Li | |
| 7,864,967 B2* | 1/2011 | Takeuchi et al. | 381/56 |
| 7,978,925 B1 | 7/2011 | Souchard | |
| 8,078,623 B2 | 12/2011 | Chou | |
| 8,150,098 B2 | 4/2012 | Gallagher | |
| 8,155,400 B2 | 4/2012 | Bronstein | |
| 8,165,352 B1 | 4/2012 | Mohanty | |
| 8,170,298 B2 | 5/2012 | Li | |
| 8,212,894 B2 | 7/2012 | Nozaki | |
| 8,224,036 B2 | 7/2012 | Maruyama | |
| 8,306,280 B2 | 11/2012 | Nozaki | |
| 8,331,632 B1 | 12/2012 | Mohanty | |
| 8,345,934 B2 | 1/2013 | Obrador | |
| 8,358,811 B2 | 1/2013 | Adams | |
| 8,384,791 B2 | 2/2013 | Porter | |
| 8,488,847 B2 | 7/2013 | Nozaki | |
| 8,611,678 B2 | 12/2013 | Hanson | |
| 8,620,649 B2* | 12/2013 | Gao | 704/219 |
| 8,705,806 B2 | 4/2014 | Nakano | |
| 8,880,439 B2 | 11/2014 | Archambeau | |
| 8,924,315 B2 | 12/2014 | Archambeau | |
| 2003/0068100 A1 | 4/2003 | Covell | |
| 2004/0240711 A1 | 12/2004 | Hamza | |
| 2005/0163372 A1 | 7/2005 | Kida | |
| 2006/0034542 A1 | 2/2006 | Aoyama | |
| 2006/0088209 A1 | 4/2006 | Yu et al. | |
| 2006/0244845 A1 | 11/2006 | Craig | |
| 2006/0280341 A1 | 12/2006 | Koshizen | |
| 2006/0290705 A1 | 12/2006 | White | |
| 2007/0002478 A1 | 1/2007 | Mowry | |
| 2007/0053607 A1 | 3/2007 | Mitsunaga | |
| 2007/0058878 A1 | 3/2007 | Gomilla | |
| 2007/0172099 A1 | 7/2007 | Park | |
| 2008/0014563 A1 | 1/2008 | Visani | |
| 2008/0183751 A1 | 7/2008 | Cazier et al. | |
| 2008/0204598 A1 | 8/2008 | Maurer et al. | |
| 2008/0212894 A1 | 9/2008 | Demirli | |
| 2009/0028380 A1 | 1/2009 | Hillebrand | |
| 2009/0087099 A1 | 4/2009 | Nakamura | |
| 2009/0116749 A1 | 5/2009 | Cristinacce | |
| 2009/0180671 A1 | 7/2009 | Lee | |
| 2009/0185723 A1 | 7/2009 | Kurtz | |
| 2009/0313546 A1 | 12/2009 | Katpelly et al. | |
| 2010/0027663 A1 | 2/2010 | Dai et al. | |
| 2010/0054544 A1 | 3/2010 | Arguelles | |
| 2010/0189313 A1 | 7/2010 | Prokoski | |
| 2010/0205177 A1 | 8/2010 | Sato | |
| 2011/0007174 A1 | 1/2011 | Bacivarov | |
| 2011/0010319 A1 | 1/2011 | Harada | |
| 2011/0064331 A1 | 3/2011 | Andres del Valle | |
| 2011/0091113 A1 | 4/2011 | Ito | |
| 2011/0129159 A1 | 6/2011 | Cifarelli | |
| 2011/0135166 A1 | 6/2011 | Wechsler | |
| 2011/0158536 A1 | 6/2011 | Nakano | |
| 2011/0176058 A1 | 7/2011 | Biswas et al. | |
| 2012/0027311 A1 | 2/2012 | Cok | |
| 2012/0076427 A1 | 3/2012 | Hibino | |
| 2012/0106859 A1 | 5/2012 | Cheatle | |
| 2012/0188382 A1 | 7/2012 | Morrison | |
| 2012/0308124 A1 | 12/2012 | Belhumeur | |
| 2013/0148864 A1 | 6/2013 | Dolson | |
| 2013/0151441 A1 | 6/2013 | Archambeau | |
| 2013/0156275 A1 | 6/2013 | Amacker | |
| 2013/0226587 A1 | 8/2013 | Cheung | |
| 2013/0227415 A1 | 8/2013 | Gregg et al. | |
| 2013/0243328 A1 | 9/2013 | Irie | |
| 2013/0266196 A1 | 10/2013 | Kono | |
| 2014/0006420 A1 | 1/2014 | Sparrow | |
| 2014/0029859 A1 | 1/2014 | Libin | |
| 2014/0046914 A1 | 2/2014 | Das | |
| 2014/0050419 A1 | 2/2014 | Lerios | |
| 2014/0072242 A1 | 3/2014 | Wei | |
| 2014/0341443 A1 | 11/2014 | Cao | |
| 2015/0347734 A1 | 12/2015 | Beigi | |

FOREIGN PATENT DOCUMENTS

| | | |
|---|---|---|
| EP | 2 267 655 A2 | 12/2010 |
| EP | 2 312 462 A1 | 4/2011 |
| WO | 2009/082814 A1 | 7/2009 |
| WO | 2009/128021 A1 | 10/2009 |
| WO | 2011/014138 A1 | 2/2011 |

OTHER PUBLICATIONS

PCT International Search Report and Written Opinion for Application No. PCT/US2015/027689, Jul. 8, 2015.

PCT International Search Report and Written Opinion for Application No. PCT/US2015/035219, Sep. 29, 2015.

Cvetkovic, "Image enhancement circuit using non-linear processing curve and constrained histogram range equalization", In Proceedings of the SPIE and IS&T Conference on Visual Communications and Image Processing, vol. 5308, Jan. 7, 2004.

U.S. Appl. No. 13/896,206, filed May 16, 2013, Xudong Cao.

U.S. Appl. No. 14/264,012, filed Apr. 28, 2014, David Lee.

U.S. Appl. No. 14/264,619, filed Apr. 29, 2014, Chunkit Jacky Chan.

U.S. Appl. No. 14/266,795, filed Apr. 30, 2014, David Lee.

U.S. Appl. No. 14/312,562, filed Jun. 23, 2014, Catalin Negrila.

Papadopoulos, "Image Clustering Through Community Detection on Hybrid Image Similarity Graphs", In Proceedings of the 17th IEEE International Conference on Image Processing (ICIP'10), Sep. 26-29, 2010.

Belhumeur, "Eigenfaces vs. Fisherfaces: Recognition Using Class Specific Linear Projection", IEEE Transactions on Pattern Analysis and Machine Intelligence, vol. 19, No. 7, Jul. 1997.

Cao, "Face Recognition with Learning-based Descriptor", IEEE Conference on Computer Vision and Pattern Recognition (CVPR'10), Jun. 13-18, 2010.

Chen, "Bayesian Face Revisited: A Joint Formulation", Proceedings of the 12th European Conference on Computer Vision (ECCV'12), Part III, Oct. 7-13, 2012.

Chen, "Supplemental material for Bayesian Face Revisited: A Joint Formulation", Feb. 2013.

Davis, "Information-Theoretic Metric Learning", Proceedings of the 24th International Conference on Machine Learning (ICML'07), Jun. 20-24, 2007.

Diez, "Optimization of a Face Verification System Using Bayesian Screening Techniques", Proceedings of the 23rd IASTED International Multi-Conference on Artificial Intelligence and Applications, Feb. 14-16, 2005.

Guillaumin, "Is that you? Metric Learning Approaches for Face Identification", Proceedings of the IEEE 12th International Conference on Computer Vision (ICCV'09), Sep. 29-Oct. 2, 2009.

Huang, "Labeled Faces in the Wild: A Database for Studying Face Recognition in Unconstrained Environments", Proceedings of the 10th European Conference on Computer Vision (ECCV'08), Oct. 12-18, 2008.

Ioffe, "Probabilistic Linear Discriminant Analysis", Proceedings of the 9th European Conference on Computer Vision (ECCV'06), May 7-13, 2006.

Kumar, "Attribute and Simile Classifiers for Face Verification", Proceedings of the 12th IEEE International Conference on Computer Vision (ICCV), Oral Session 14: Recognition, Detection and Matching, Sep. 27-Oct. 4, 2009.

(56) References Cited

OTHER PUBLICATIONS

Kumar, "Describable Visual Attributes for Face Verification and Image Search", IEEE Transactions on Pattern Analysis and Machine Intelligence, vol. 33, Issue 10, Oct. 2011.
Kumar, "Face Recognition Using Gabor Wavelets", Proceedings of the 40th IEEE Asilomar Conference on Signals, Systems and Computers, Oct. 29-Nov. 1, 2006.
Lei, "Face Recognition by Exploring Information Jointly in Space, Scale and Orientation", IEEE Transactions on Image Processing, vol. 20, No. 1, Jan. 2011.
Li, "Bayesian Face Recognition Using Support Vector Machine and Face Clustering", Proceedings of the 2004 IEEE Computer Society Conference on Computer Vision and Pattern Recognition (CVPR'04), Jun. 27-Jul. 2, 2004.
Li, "Probabilistic Models for Inference about Identity", IEEE Transactions on Pattern Analysis and Machine Intelligence, vol. 34, No. 1, Jan. 2012 (published online May 13, 2011).
Liang, "Face Alignment via Component-based Discriminative Search", Proceedings of the 10th European Conference on Computer Vision (ECCV'08), Part II, Oct. 12-18, 2008.
Moghaddam, "Bayesian face recognition", The Journal of Pattern Recognition Society, vol. 33, No. 11, Nov. 2000.
Nguyen, "Cosine Similarity Metric Learning for Face Verification", Proceedings of the 10th Asian Conference on Computer Vision (ACCV'10), Part II, Nov. 8-12, 2010.
Ojala, "A Generalized Local Binary Pattern Operator for Multiresolution Gray Scale and Rotation Invariant Texture Classification", Proceedings of the 2nd International Conference on Advances in Pattern Recognition (ICAPR'01), Mar. 11-14, 2001.
Phillips, "The FERET Evaluation Methodology for Face-Recognition Algorithms", IEEE Transactions on Pattern Analysis and Machine Intelligence, vol. 22, No. 10, Oct. 2000.
Ramanan, "Local Distance Functions: A Taxonomy, New Algorithms, and an Evaluation", IEEE Transactions on Pattern Analysis and Machine Intelligence, vol. 33, No. 4, Apr. 2011 (published online Jun. 28, 2010).
Seo, "Face Verification Using the LARK Representation", IEEE Transactions on Information Forensics and Security, vol. 6, No. 4, Dec. 2011.
Susskind, "Modeling the joint density of two images under a variety of transformations", Proceedings of the 2011 IEEE Conference on Computer Vision and Pattern Recognition (CVPR'11), Jun. 20-25, 2011.
Taigman, "Leveraging Billions of Faces to Overcome Performance Barriers in Unconstrained Face Recognition", arXiv:1108.1122v1, Aug. 4, 2011.
Taigman, "Multiple One-Shots for Utilizing Class Label Information", Proceedings of the British Machine Vision Conference (BMVC'09), Sep. 7-10, 2009.
Wang, "A Unified Framework for Subspace Face Recognition", IEEE Transactions on Pattern Analysis and Machine Intelligence, vol. 26, No. 9, Sep. 2004.
Wang, "Bayesian Face Recognition Using Gabor Features", Proceedings of the 2003 ACM SIGMM Workshop on Biometrics Methods and Applications (WBMA'03), Nov. 8, 2003.
Wang, "Boosted Multi-Task Learning for Face Verification with Applications to Web Image and Video Search", Proceedings of the IEEE Conference on Computer Vision and Pattern Recognition (CVPR'09), Jun. 20-25, 2009.
Wang, "Subspace Analysis Using Random Mixture Models", Proceedings of the 2005 IEEE Computer Society Conference on Computer Vision and Pattern Recognition (CVPR'05), Jun. 20-25, 2005.
Weinberger, "Distance Metric Learning for Large Margin Nearest Neighbor Classification", Proceedings of the Conference on Advances in Neural Information Processing Systems 18 (NIPS'05), Dec. 5-8, 2005.
Yin, "An Associate-Predict Model for Face Recognition", Proceedings of the IEEE Conference on Computer Vision and Pattern Recognition (CVPR'11), Jun. 20-25, 2011.
Ying, "Distance Metric Learning with Eigenvalue Optimization", Journal of Machine Learning Research, vol. 13, No. 1, Jan. 2012.
Zhang, "Two-Dimensional Bayesian Subspace Analysis for Face Recognition", Proceedings of the 4th International Symposium on Neural Networks (ISNN'07), Part II, Jun. 3-7, 2007.
Zhu, "A Rank-Order Distance based Clustering Algorithm for Face Tagging", Proceedings of the IEEE Conference on Computer Vision and Pattern Recognition (CVPR'11), Jun. 20-25, 2011.
Li, "Joint and Implicit Registration for Face Recognition", Proceedings of the IEEE Computer Society Conference on Computer Vision and Pattern Recognition (CVPR'09), Jun. 20-25, 2009.
Tsay, "Personal Photo Organizer based on Automated Annotation Framework", In Proceedings of the Fifth International Conference on Intelligent Information Hiding and Multimedia Signal Processing (IIH-MSP'09), Sep. 12-14, 2009.
Zwol, "Prediction of Favourite Photos using Social, Visual, and Textual Signals", In Proceedings of the 18th International Conference on Multimedia, Oct. 25-29, 2010.
De Neve, "Face Recognition for Personal Photos using Online Social Network Context and Collaboration", Guest Lecture at KAIST, Korea Advanced Institute of Science and Technology, Image and Video Systems Lab, Dec. 14, 2010.
Mavridis, "Friends with Faces: How Social Networks Can Enhance Face Recognition and Vice Versa", In book Computational Social Networks Analysis: Trends, Tools and Research Advances, Springer, Nov. 6, 2009.
Choi, "Face Annotation for Personal Photos Using Collaborative Face Recognition in Online Social Networks", In Proceedings of the 16th International Conference on Digital Signal Processing (DSP'09), Jul. 5-7, 2009.
Starr, "Facial recognition app matches strangers to online profiles", CNET, Tech Culture, Jan. 7, 2014.
PCT International Search Report and Written Opinion for Application No. PCT/US2015/027688, Jul. 9, 2015.
PCT Written Opinion for Application No. PCT/US/2015/027688, Feb. 9, 2016.
PCT International Search Report and Written Opinion for Application No. PCT/US2015/026971, Jul. 24, 2015.
Tian, "Handbook of Face Recognition, Chapter 11, Facial Expression Analysis", Springer, 2005.
Cootes, "Handbook of Face Recognition, Chapter 3, Modeling Facial Shape and Appearance", Springer, 2005.
Ding, "Handbook of Face Recognition, Second Edition, Chapter 12, Facial Landmark Localization", Springer, 2011.
Shah, "All Smiles: Automatic Photo Enhancement by Facial Expression Analysis", In Proceedings of the Conference on Visual Media Production (CVMP'12), Dec. 5-6, 2012.
Perenson, "In-depth look at Google+ photo update with the team that designed it", dpreview.com, May 17, 2013.
PCT Second Written Opinion for Application No. PCT/US2015/035219, Apr. 26, 2016.
Lanitis, "Toward Automatic Simulation of Aging Effects on Face Images", In Proceedings of the IEEE Transactions on Pattern Analysis and Machine Intelligence, vol. 24, No. 4, Apr. 2002.
Lu, "Context-Aware Textures", In Journal of ACM Transactions on Graphics, vol. 26, No. 1, Jan. 2007.
Gooch, "Color2Gray: Salience-Preserving Color Removal", In Proceedings of the ACM SIGGRAPH Transactions on Graphics, vol. 24, No. 3, Jul. 2005.
Dong, "Image Retargeting by Content-Aware Synthesis", arXiv:1403.6566v1 [cs.GR], Mar. 26, 2014.
Shan, "Image-Based Surface Detail Transfer", In IEEE Computer Graphics and Appliances, vol. 24, No. 3, May-Jun. 2004.
PCT Second Written Opinion for Application No. PCT/US2015/026971, Mar. 30, 2016.

* cited by examiner

AUTOMATIC VIDEO QUALITY ENHANCEMENT WITH TEMPORAL SMOOTHING AND USER OVERRIDE

BACKGROUND

Thanks to advances in imaging technologies, people take more videos and pictures than ever before. But it is common to see flaws in videos and pictures due to under or over exposure, shakiness, various forms of noise, etc. Reasons for these flaws include the environment (e.g., low-light or noisy environment) of the capture equipment (e.g., video captured on a camera phone without a tripod). Such flaws may be corrected after-the-fact, but average users may not be familiar with the methods and tools for correction. Further, conventional video editing tools may be limited in their abilities to correct such flaws. For example, many tools apply correction settings to all frames of a video and opposed to individual frames—but such corrections are likely not optimal over the entire duration of the video. Further, many tools require multiple passes, each pass including a time-consuming and memory-consuming decode step, all resulting in an inability to provide a user with immediate previews of corrected frames.

SUMMARY

The summary provided in this section summarizes one or more partial or complete example embodiments of the invention in order to provide a basic high-level understanding to the reader. This summary is not an extensive description of the invention and it may not identify key elements or aspects of the invention, or delineate the scope of the invention. Its sole purpose is to present various aspects of the invention in a simplified form as a prelude to the detailed description provided below.

The invention encompasses technologies for a single-pass process for enhancing video quality with temporal smoothing. The process may include providing for user overrides of automatically enhanced video/frame characteristics and providing substantially immediate previews of enhanced video frames to a user. The process may also include detecting a degree of shakiness in a portion of the video, and performing or recommending stabilization based on the detected shakiness.

Many of the attendant features will be more readily appreciated as the same become better understood by reference to the detailed description provided below in connection with the accompanying drawings.

DESCRIPTION OF THE DRAWINGS

The detailed description provided below will be better understood when considered in connection with the accompanying drawings, where.

Like-numbered labels in different figures are used to designate similar or identical elements or steps in the accompanying drawings.

DETAILED DESCRIPTION

The detailed description provided in this section, in connection with the accompanying drawings, describes one or more partial or complete example embodiments of the invention, but is not intended to describe all possible embodiments of the invention. This detailed description sets forth various examples of at least some of the technologies, systems, and/or methods invention. However, the same or equivalent technologies, systems, and/or methods may be realized according to examples as well.

Although the examples provided herein are described and illustrated as being implementable in a computing environment, the environment described is provided only as an example and not a limitation. As those skilled in the art will appreciate, the examples disclosed are suitable for implementation in a wide variety of different computing environments.

Figure 1:
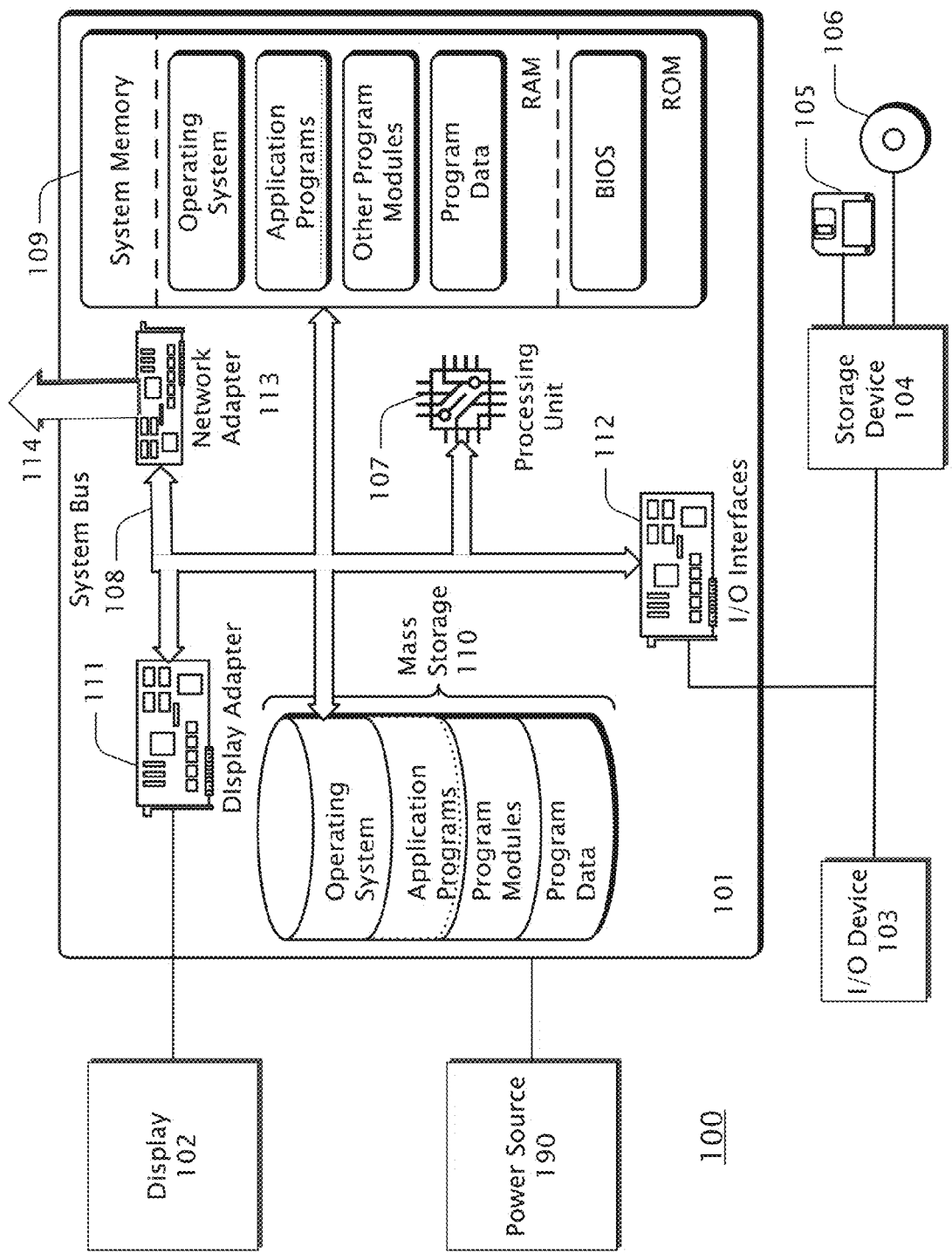
FIG. 1 is a block diagram showing an example computing environment in which the invention described herein may be implemented.

FIG. 1 is a block diagram showing an example computing environment 100 in which the invention described herein may be implemented. A suitable computing environment may be implemented with numerous general purpose or special purpose systems. Examples of well known systems include, but are not limited to, cell phones, personal digital assistants ("PDA"), personal computers ("PC"), hand-held or laptop devices, microprocessor-based systems, multiprocessor systems, systems on a chip ("SOC"), servers, Internet services, workstations, consumer electronic devices, cell phones, set-top boxes, and the like. In all cases, such systems are strictly limited to articles of manufacture and the like.

Computing environment 100 typically includes a general-purpose computing system in the form of a computing device 101 coupled to various components, such as peripheral devices 102, 103, 101 and the like. These may include components such as input devices 103, including voice recognition technologies, touch pads, buttons, keyboards and/or pointing devices, such as a mouse or trackball, that may operate via one or more input/output ("I/O") interfaces 112. The components of computing device 101 may include one or more processors (including central processing units ("CPU"), graphics processing units ("GPU"), microprocessors ("µP"), and the like) 107, system memory 109, and a system bus 108 that typically couples the various components. Processor(s) 107 typically processes or executes various computer-executable instructions and, based on those instructions, controls the operation of computing device 101. This may include the computing device 101 communicating with other electronic and/or computing devices, systems or environments (not shown) via various communications technologies such as a network connection 114 or the like. System bus 108 represents any number of bus structures, including a memory bus or memory controller, a peripheral bus, a serial bus, an accelerated graphics port, a processor or local bus using any of a variety of bus architectures, and the like.

System memory 109 may include computer-readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 109 typically stores data, computer-executable instructions and/ or program modules comprising computer-executable instructions that are immediately accessible to and/or presently operated on by one or more of the processors 107.

Mass storage devices 104 and 110 may be coupled to computing device 101 or incorporated into computing device 101 via coupling to the system bus. Such mass storage devices 104 and 110 may include non-volatile RAM, a magnetic disk drive which reads from and/or writes to a removable, non-volatile magnetic disk (e.g., a "floppy disk") 105, and/or an optical disk drive that reads from and/or writes to a non-volatile optical disk such as a CD ROM, DVD ROM 106. Alternatively, a mass storage device, such as hard disk 110, may include non-removable storage medium. Other mass storage devices may include memory cards, memory sticks, tape storage devices, and the like.

Any number of computer programs, files, data structures, and the like may be stored in mass storage 110, other storage devices 104, 105, 106 and system memory 109 (typically limited by available space) including, by way of example and not limitation, operating systems, application programs, data files, directory structures, computer-executable instructions, and the like.

Output components or devices, such as display device 102, may be coupled to computing device 101, typically via an interface such as a display adapter 111. Output device 102 may be a liquid crystal display ("LCD"). Other example output devices may include printers, audio outputs, voice outputs, cathode ray tube ("CRT") displays, tactile devices or other sensory output mechanisms, or the like. Output devices may enable computing device 101 to interact with human operators or other machines, systems, computing environments, or the like. A user may interface with computing environment 100 via any number of different I/O devices 103 such as a touch pad, buttons, keyboard, mouse, joystick, game pad, data port, and the like. These and other I/O devices may be coupled to processor 107 via I/O interfaces 112 which may be coupled to system bus 108, and/or may be coupled by other interfaces and bus structures, such as a parallel port, game port, universal serial bus ("USB"), fire wire, infrared ("IR") port, and the like.

Computing device 101 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 101 may be coupled to a network via network adapter 113 or the like, or, alternatively, via a modem, digital subscriber line ("DSL") link, integrated services digital network ("ISDN") link, Internet link, wireless link, or the like.

Communications connection 114, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 190, such as a battery or a power supply, typically provides power for portions or all of computing environment 100. In the case of the computing environment 100 being a mobile device or portable device or the like, power source 190 may be a battery. Alternatively, in the case computing environment 100 is a desktop computer or server or the like, power source 190 may be a power supply designed to connect to an alternating current ("AC") source, such as via a wall outlet.

Some mobile devices may not include many of the components described in connection with FIG. 1. For example, an electronic badge may be comprised of a coil of wire along with a simple processing unit 107 or the like, the coil configured to act as power source 190 when in proximity to a card reader device or the like. Such a coil may also be configure to act as an antenna coupled to the processing unit 107 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 102, I/O device 103, or many of the other components described in connection with FIG. 1. Other mobile devices that may not include many of the components described in connection with FIG. 1, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, program modules, or the like maintained in an electronic device such as a ROM. The term "software" generally refers to computer-executable instructions, code, data, applications, programs, program modules, or the like maintained in or on any form or type of computer-readable media that is configured for storing computer-executable instructions or the like in a manner that is accessible to a computing device. The term "computer-readable media" and the like as used herein is strictly limited to one or more apparatus, article of manufacture, or the like that is not a signal or carrier wave per se. The term "computing device" as used in the claims refers to one or more devices such as computing device 101 and encompasses client devices, mobile devices, one or more servers, network services such as an Internet service or corporate network service, and the like, and any combination of such.

Figure 2:
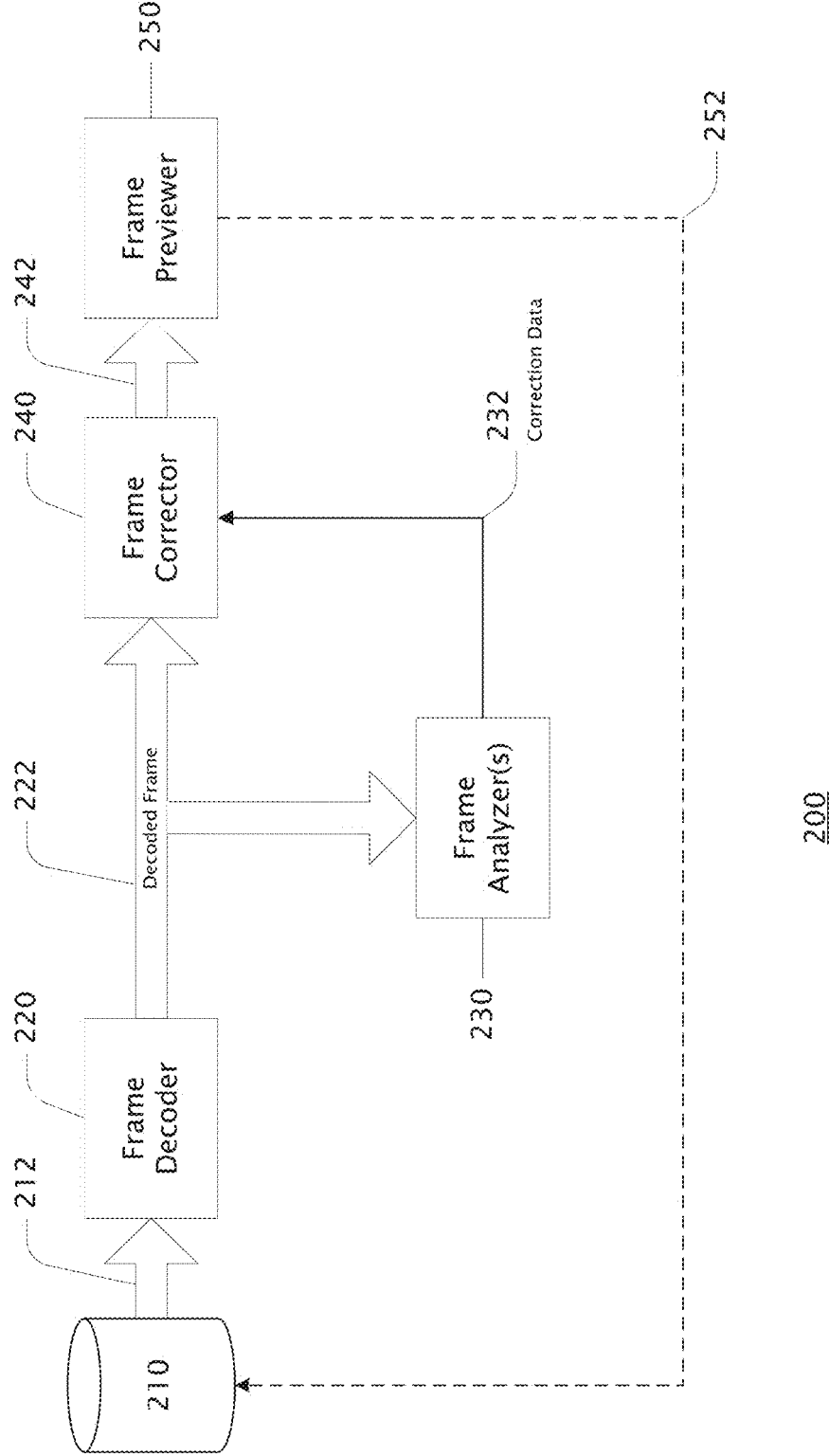
FIG. 2 is a block diagram showing an example system configured for enhancement of video quality.

FIG. 2 is a block diagram showing an example system 200 configured for enhancement of video quality with temporal smoothing and user override. In one example, the enhancement is based on a single pass over the frames of the video. The system 200 comprises several modules including data store 210, frame decoder 220, frame analyzer(s) 230, frame corrector 240, and frame previewer 250. Each of these modules (including any sub-modules and any other modules described herein) may be implemented in hardware, firmware, software (e.g., as program modules comprising computer-executable instructions), or any combination thereof. Each such module may be implemented on/by one device, such as a computing device, or across multiple such devices and/or services. For example, one module may be implemented in a distributed fashion on/by multiple devices such as servers or elements of a network service or the like. Further, each such module (including any sub-modules) may encompass one or more sub-modules or the like, and the modules may be implemented as separate modules, or any two or more may be combined in whole or in part. The division of modules (including any sub-modules) described herein is non-limiting and intended primarily to aid in describing aspects of the invention. The term "video" as used herein generally refers to digital video, video stream, or the like, and also refers to individual digital images which may be similar to individual frames of a video. In other words, processes described herein that apply to, or modules that operate on, frames of a video may additionally or alternatively be applied to/operate on individual images and/or audio samples.

In summary, system 200 comprises a computing device, such as described in connection with FIG. 1, and at least one program module, such as the modules described in connection with FIG. 2, that are together configured for performing actions for automatically enhancing the quality of a video in a single-pass operation along with providing for user overrides and providing substantially immediate previews of enhanced video frames to a user. Videos (and/or images) are typically provided (212) by one or more sources 210. Such sources typically include camera phones, digital cameras, digital video recorders ("DVRs"), computers, digital photo albums, social media applications or websites, video streaming web sites, or any other source of digital videos. Such videos may belong to one or more users and may be stored in data store 210 that may be part of or separate from system 200. In one example, system 200 automatically enhances the quality of videos stored on data store 210.

Frame decoder 220 is a module that is configured for decoding frames of a video. In one example, frame decoder 220 decodes a frame of video, provides the decoded frame as indicated by fat arrow 222, and the decoded frame is processed by system 200. Once processed, the decoded frame is typically discarded so as to minimize memory usage. In general, because system 200 is typically a single-pass system, each frame of video is decoded only once. In certain cases, system 200 may operate using multiple passes, such as when speed of operation or immediate preview is not required. Frame decoder module 220 typically provides the decoded video frame to frame analyzer(s) 230 and frame corrector 240.

Frame analyzer(s) 230 represents one or more modules that are each configured for analyzing one or more characteristics of a decoded video frame, such as brightness, exposure, white-balance, chroma-noise, audio noise, shakiness, etc. Each frame analyzer 230 may be configured for analyzing one or more characteristics of an input frame. In general, analysis by a module 230 may include sampling pixels of a decoded frame provided as input (222) and generating correction data for one or more characteristics of the input frame, where the correction data is provided as output (232) to frame corrector 240. Note that provided (232) correction data tends to require significantly less storage space (e.g., memory) than provided (212, 222, 242) frames or frame data. An example frame analyzer is described in more detail in connection with FIG. 3.

Frame corrector 240 is a module that is configured for correcting a decoded frame provided as input (222) according to correction data provided as input (232). The correction data (also known herein as correction parameters) typically includes a correction curve or the like for each characteristic of the input frame being corrected. Frame corrector 240 typically performs the correcting by applying the provided (232) correction data to the input frame, a process that typically occurs once per frame being corrected. In one example, a user may adjust one or more characteristics manually while previewing a corrected frame. Such user adjustment may be repeated resulting in applying correction data to an input frame more than once. Frame corrector 240 typically provides (242) the corrected frame to frame previewer 250.

Frame previewer 250 is a module that is configured for enabling a user to preview a corrected frame. Module 250 may operate in conjunction with user control(s) 350 to enable a user to adjust control points for particular characteristics of a frame to preview the results substantially immediately. In one example, frame preview module 270 presents the original decoded frame and/or the corrected version of the frame to the user via a user interface. Previewing frames or any particular frame may be optional, such as when system 200 is operating in a completely automatic fashion. Frame previewer 250 may enable the user to step forward or backward among frames in a video to preview the frames substantially immediately.

Line 252 typically indicates optionally re-encoding the frames and/or adding the frames to data store 210, or replacing the original video with, some or all processed and re-encoded frames of the original video.

Figure 3:
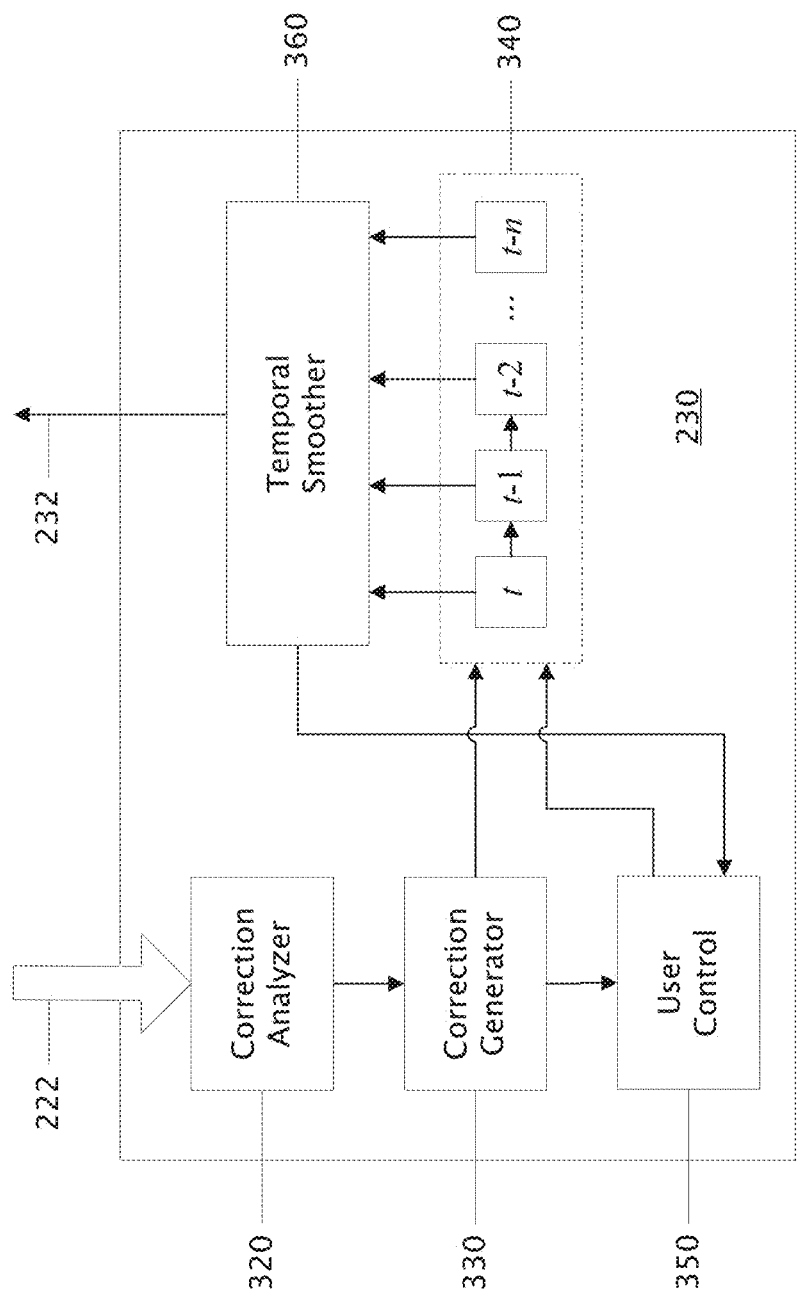
FIG. 3 is a block diagram showing an example frame analyzer configured for analysis of a frame resulting in correction data for the frame.

FIG. 3 is a block diagram showing an example frame analyzer 230 configured for analysis of a frame resulting in correction data for the frame. A frame analyzer 230 typically comprises several modules including correction analyzer 320, correction generator 330, correction data storage 340, user control module 350, and temporal smoother 360. Some frame analyzers 230 may not include all of these modules and/or may include other modules. The structure and/or function of each of these modules may vary according to the particular frame characteristic being analyzed.

In summary, each frame analyzer 230 is configured for performing actions for performing a single-pass analysis of a characteristic of an input frame, for generating, based on the analysis, correction data for that characteristic, and for providing for user control over the correction data. In general, one frame analyzer 230 is provided for each frame characteristic to be corrected. For each frame analyzer 230, a decoded frame is typically provided as input (222). The generated correction data may be retained in store 340 and provided as output (232). In general, an input frame is not retained once analysis of the frame is complete. Store 340 may be common across some or all frame analyzers 230. That is, one store 340 may be provided that is utilized by some or all frame analyzers 230.

Correction analyzer 320 is a module that is configured for analyzing a particular characteristic of an input frame, such as brightness, exposure, white-balance, chroma-noise, audio noise, shakiness, etc. Analysis typically involves analyzing some or all of the pixels of the input frame (or some or all of the audio samples). Data resulting from the analysis is typically provided to correction generator 330. Such resulting data may include a histogram or the like that represents the frame characteristic being analyzed.

Correction generator 330 is a module that is configured for generating correction data based on at least the data resulting from the analysis of the characteristic of the input frame provided by correction analyzer 320. In one example, the generated correction data includes a correction curve for the characteristic of the input frame, such as curve 610 illustrated in FIG. 6. In this example, the generated correction curve is an optimal correction curve for the characteristic of the frame.

In general, the correction curve describes a transformation for the input frame. In one example, two control points are associated with the correction curve. These control points may be used to modify the shape of the curve from that initially generated, such as for modifying the shape of the curve from optimal according to user input or for smoothing. In other examples, other numbers of control points may be used. An example method for generating a correction curve is described in connection with FIG. 5. Such a method may be performed by correction generator 330. One correction curve is typically generated by each frame analyzer 230, and one correction curve is typically generated for each characteristic being analyzed in the frame.

Once a correction curve is generated, it is typically provided to and retained in store 340, and also to user control module 350, potentially along with additional correction data indicating the particular characteristic and decoded frame that it applies to. In addition, a null correction curve 620 may also be passed to user control module 350. In various examples, store 340 only retains data for a particular characteristic from the most recent n analyzed frames. In such examples, once characteristic data for the n+1 frame is generated, the oldest data for that characteristic is discarded from store 340. Thus, when n is a relatively small number compared to the size of frames, such discarding minimizes the data storage space requirements for each frame analyzer 230. In one example, for single-pass operation n is 5, and for two-pass operation n is 9.

User control module 350 is a module that is configured for enabling a user to manipulate controls points of a correction curve, such as received from correction generator 330 and/or temporal smoother 360. The term "user" as used herein refers to a person or system of any type. In one example, a user may adjust sliders in a user interface to manipulate the position of a control point, thus changing the shape of a correction curve accordingly. Such control points are described in connection with FIG. 6. User control module 350 may also blend the pass-through correction data with smoothed characteristic data provided by temporal smoother 360. User override operations may be optional, such as when system 200 is operating in a completely automatic fashion. In one example, user override information may not represent absolute control over the shape of a correction curve, but may only influence the shape along with at least smoothing information. User manipulated correction data is typically provided to and retained in store 340.

Temporal smoother 360 is a module that is configured for smoothing the variance of a characteristic in a frame relative to that characteristic (and/or other characteristics) in previously-processed frames of a video. The term "smoothing" as used herein generally refers to reducing abruptness of a change in a characteristic of a frame relative to that of previously-processed frames. An example method for smoothing is described in connection with FIG. 7. Such a method may be performed by temporal smoother 360. One characteristic of a frame is typically smoothed independent of any other characteristics of the frame. Relevant correction data for smoothing from currently- and/or previously-processed frames is typically retrieved from store 340. Temporal smoother 360 typically provides correction data as output (232) and to user control module 350.

One particular type of frame analyzer is a shakiness analyzer, a module that is configured for analyzing frames of a video to determine a degree of shakiness of at least a portion of the video. The term "shakiness" or the like as used herein generally refers to unintentional movement largely due to instability, such as when a camera is capturing a scene while being held without sufficient stability resulting in a shaky image(s). Shakiness is generally unintentional relative motion between a capture device and the scene as opposed to intentional motion such as panning, zooming, movement in the scene, and the like. In one example, the degree of shakiness, or a shakiness score, is compared to a threshold and, if exceeded, stabilization is performed or recommended. An example method for determining a degree of shakiness is described in connection with FIG. 9. Such a method may be performed by a shakiness analyzer 230.

Figure 4:
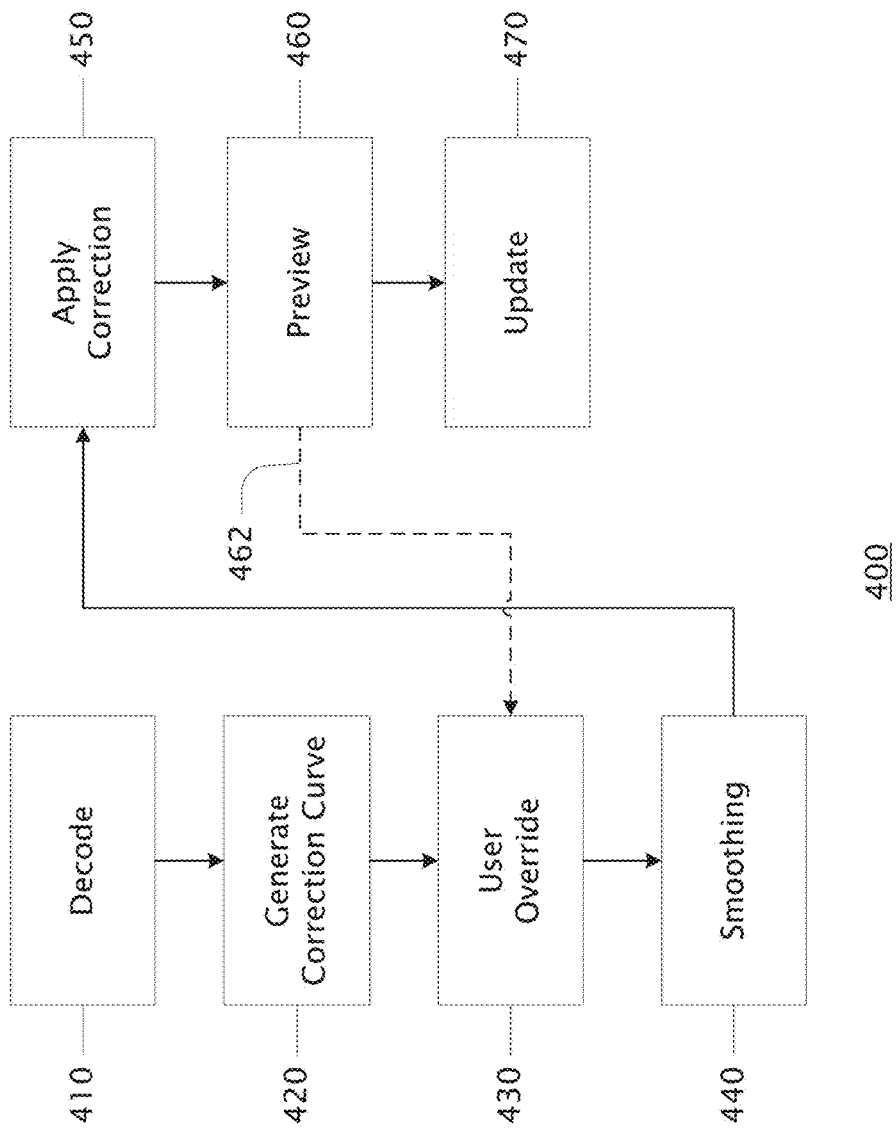
FIG. 4 is a block diagram showing an example method for automatically enhancing the quality of a video.

FIG. 4 is a block diagram showing an example method 400 for automatically enhancing the quality of a video in a single-pass process. Method 400 may also include providing for user overrides and providing substantially immediate previews of enhanced video frames to a user. Such a method may be performed by system 200 or the like. In one example, method 400 is performed on a computing device, such as describe in connection with FIG. 1, that is controlled according to computer-executable instructions of program modules (e.g., software), such as at least a portion of those described in connection with FIG. 2, that, when executed by the computing device, cause the computing device to perform some or all aspects of method 400. In other examples, the modules described in connection with FIG. 2 may be implemented as firmware, software, hardware, or any combination thereof. Additionally or alternatively, the modules may be implemented as part of a system on a chip ("SoC"). Such (or the like) may be the case with other methods and/or modules described herein as well.

Step 410 typically indicates decoding one or more frames of a video. Such decoding may be performed by frame decoder 220. The video may be selected and/or provided (212) from data store 210 or the like. In one example, data store 210 may include a user's media collection. System 200 may process some or all videos from such a collection, selecting the videos for processing one or more at a time. The decoding generally results in at least one decoded video frame. The decoding may alternatively or additionally result in at least one decoded audio sample. The term "video frame" as used here may additionally or alternatively refer to an audio sample. In one example, system 200 decodes and processes only one video frame at a time in order to minimize memory consumption. In this example, information resulting from the processing may be persisted (such as in store 340), but the decoded and processed video frame may be discarded prior to decoding another video frame. Should one or more previous frames be required to decode a particular video frame, then those frames may be persisted until the particular video frame has been decoded, at which point the required frames may be discarded (unless they are also required to decode a next video frame). Once a video frame is decoded, the decoded frame is generally provided as input to step 420 of method 400. The term "frame" as used herein typically refers to a decoded frame or sample unless context or description indicates otherwise. In general, processing by system 200 requires a decoded frame or the like.

Step 420 typically indicates generating a correction curve for each of one or more characteristics of the frame. An example method for generating a correction curve is provided in connection with FIG. 4. Such generating may include analyzing the frame, and may be performed by one or more frame analyzers 230. In one example, the generating of step 420 results in correction curve for the characteristic of the frame, typically an optimal correction curve. Further, a separate curve may be generated for each of several frame characteristics. Once a correction curve is generated, it is typically retained in store 340 along with information indicating the particular characteristic and frame it applies to. Further, the correction curve(s) is generally provided as input to step 430 of method 400. The term "optimal correction curve" as used herein is defined as a function that is most correct for transforming a characteristic of a single frame of a video as opposed to a set of frames including the single frame and its neighbors or all frames of the video. Each such correction curve is contextually optimal for a particular frame characteristic, such as brightness or contrast or some other frame characteristic.

Step 430 typically indicates receiving any user override to the correction curve. User override operations may be optional, such as when system 200 is operating in a completely automatic fashion. Further, separate user override information may be provided for the curve of any of the frame characteristics. In one example, a user may adjust sliders, such as high-low sliders or x-y sliders, in a user interface to manipulate the position of a control point, thus changing the shape of a correction curve accordingly. Such control points are described in connection with FIG. 6. Any user override information may be provided along with the correction curve(s) as input to step 440 of method 400.

Step 440 typically indicates smoothing the variance of a characteristic in a frame relative to that characteristic (and/or other characteristics) in previously-processed frames of the video. One characteristic of a frame is typically smoothed independent of any other characteristics of the frame. In one example, such smoothing comprises influencing the control points of a correction curve based on magnitude and direction trends of the correction curves of previous frames. An example method for smoothing a correction curve is provided in connection with FIG. 7. Such smoothing may be performed by temporal smoother 360. In general, the correction curve(s), as influenced by smoothing and any user override, is provided as a final correction curve(s) as input to step 450 of method 400.

Step 450 typically indicates applying the final correction curve(s) to the characteristic(s) of the frame. In one example, a characteristic of the frame is transformed by applying its correction curve. In general, the curve is applied to the characteristic data of the decoded frame resulting in transformed characteristic data for a corrected frame that corresponds to the decoded frame. One characteristic of a frame is typically transformed independent of any other characteristics of the frame. The particular characteristic being transformed may determine any particular channel or color space or the like that the correction curve is applied to in order to obtain transformed characteristic data. Such applying is typically performed by frame corrector 240. In one example, a correction curve is applied only once in the form of the final correction curve. Once a corrected frame has been generated based on the transformed characteristic(s), the corrected frame is generally provided as input to step 460 of method 400.

Step 460 typically indicates providing a preview of the corrected frame to a user. Previewing frames or any particular frame may be optional, such as when system 200 is operating in a completely automatic fashion. Previewing may include presenting the original decoded frame and/or the corrected version of the frame to the user. Previewing may be performed by frame previewer 250, and may allow a user to provide user override information as described in step 430. Such override information provided during previewing may result in substantially real-time correction to the frame. In other words, override information provided during previewing may be processed substantially immediately so as to adjust the presentation of the frame substantially immediately, resulting in "live preview". Once any previewing is complete (typically as indicated by the user), method 400 generally continues at step 470.

Step 470 typically indicates optionally adding to data store 210, or replacing the original video with, some or all processed frames of the original video. For example, a corrected version of a video may be added (252) to data store 210. In another example, an original video may be replaced with a corrected version. In yet another example, only one or more portion of a video may be added or replaced. Once any updating is complete, method 400 is typically complete.

Figure 5:
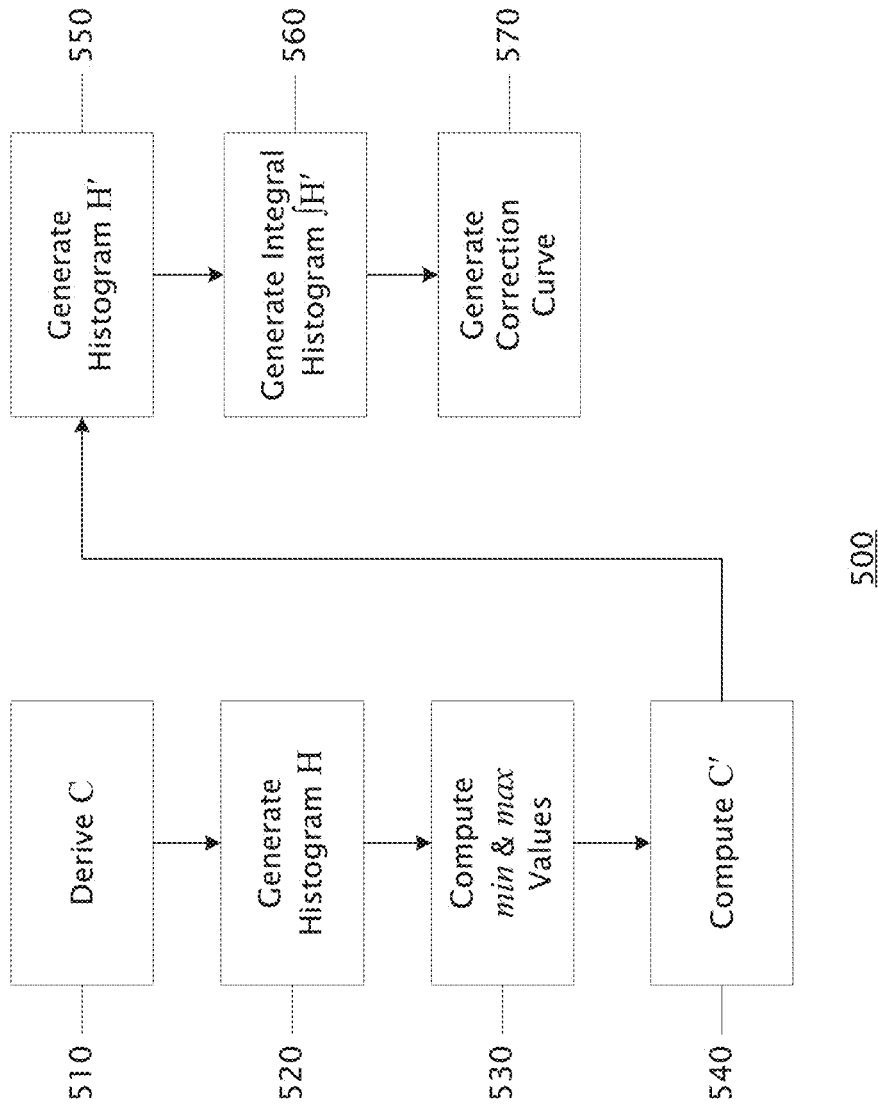
FIG. 5 is a block diagram showing an example method for generating a correction curve for a particular characteristic of a frame.

FIG. 5 is a block diagram showing an example method 500 for generating a correction curve for a particular characteristic of a frame. Such a method may be performed by frame analyzer 230 or the like. In one example of method 500, the generated correction curve is an optimal correction curve for the characteristic of the frame. A decoded frame and an indication of the particular characteristic of the frame may be provided as input to method 500. Further, the decoded frame may be transformed as needed and provided in a format suitable for generating the correction curve for the particular characteristic. For example, the frame may be provided in a luminance/chroma color space such as an (Y, Cb, Cr) format, a red-green-blue color space such as an RGB or sRGB format, or any other suitable format.

Step 510 typically indicates deriving characteristic data C for a particular characteristic from the frame. In one example, the characteristic data C is derived by sample every nth pixel of the frame. For example, for a brightness characteristic, the frame may be provided in (Y, Cb, Cr) format and luminance data (Y) is derived from every nth pixel of the frame. Alternatively, if the frame is provided in an RGB format and the luminance component Y is not directly available, it may be computed based on a combination of the RGB values where, in one example, $Y=0.299*R+0.587*G+0.114*B$. Once the characteristic data C is derived, method 500 typically continues at step 520.

Step 420 typically indicates generating a histogram H or the like from the derived characteristic data C. Once the histogram H is generated, method 500 typically continues at step 530.

Step 530 typically indicates computing min and max characteristic values (C min and C max) from the histogram H. In one example, the min and max values are set to the 0.5% and the 99.5% percentage values from histogram H respectively. In other examples, other percentage values may be used. Once the C min and C max values are computed, method 500 typically continues at step 540.

Step 540 typically indicates computing new characteristic data C' from histogram H based on the min and max values. In this example, each characteristic value c from the histogram H that is below the min value is set to the min value, and each characteristic value c from the histogram H that is above the mar value is set to the ma value. Further, each new characteristic value c' of the new characteristic data C' is computed such that c'=(c−C min)/C max−C min). These new values may be normalized in a range from 0-1. Once the new characteristic data C' is computed, method 500 typically continues at step 550.

Step 550 typically indicates generating a new histogram H' based on the new characteristic data C'. The new histogram H' may exclude 0 and 1. Values in the new histogram H' may be bounded by the min and mar values. Once the new histogram H' is generated, method 500 typically continues at step 560.

Step 560 typically indicates generating an integral histogram ∫H' based on new histogram H', where ∫H'(i)=∫H'(i−1)+H'(i) for increasing i. In one example, i represents an index into an array of characteristic values and may have a range of [0, 256] or some other range. The correction curve is typically modeled on this integral histogram ∫H'. For example, a fitted cubic parametric polynomial is generated based on the integral histogram ∫H':

$$x(t)=a_{x3}t^3+a_{x2}t^2+a_{x1}t+a_{x0}$$

$$y(t)=a_{y3}t^3+a_{y2}t^2+a_{y1}t+a_{y0}$$

where x is the input (uncorrected) characteristic value, where y is the output (corrected) characteristic value, where t is an index into the correction curve in the range [0.0, 1.0], and where the a values are the polynomial coefficients.

The fitted polynomial and a null polynomial (e.g., based on null correction curve 620) may be blended by user control 350, thus enabling a user to weaken or exaggerate the characteristic. For cubic polynomials, the null polynomial coefficients may be:

$$a_3=a_2=a_0=0$$

$$a_1=1$$

In this example, if the user desired to change the strength of the characteristic to Q relative to the optimal value of Q=1, the new (prime) polynomial coefficients would be:

$$a_3'=Qa_3$$

$$a_2'=Qa_2$$

$$a_1'=(a_1-1)Q+1$$

$$a_0'=Qa_0$$

In this example, user control 350 may provide a single slider or mechanism that represents/controls the strength of the characteristic.

Alternatively, the fitted polynomial may be represented by a cubic Bézier control graph, whose four control points are computed from the polynomial coefficients:

$$\begin{bmatrix} P_0 \\ P_1 \\ P_2 \\ P_3 \end{bmatrix} = \begin{bmatrix} -1 & 3 & -3 & 1 \\ 3 & -6 & 3 & 0 \\ -3 & 3 & 0 & 0 \\ 1 & 0 & 0 & 0 \end{bmatrix}^{-1} \begin{bmatrix} a_3 \\ a_2 \\ a_1 \\ a_0 \end{bmatrix} = \frac{1}{3}\begin{bmatrix} 0 & 0 & 0 & 3 \\ 0 & 0 & 1 & 3 \\ 0 & 1 & 2 & 3 \\ 3 & 3 & 3 & 3 \end{bmatrix} \begin{bmatrix} a_3 \\ a_2 \\ a_1 \\ a_0 \end{bmatrix}$$

In this alternative example, user control 350 may enable the user to directly or indirectly reposition these points.

In order to efficiently apply a correction to a frame, the correction curve modeled on the integral histogram ∫H' may be expressed as a look-up table that is constructed based on the parametric polynomial derived from the integral histogram. In one example, such a look-up table may be constructed by running the value x at each index of the new histogram H' backward through the x-polynomial x(t) to obtain the value t, and then evaluating the y-polynomial y(t) at that t value. In this example, the correction curve is generated in the form of the look-up table. In other examples, the correction curve may be generated in any other suitable form. Once the correction curve is generated, method 500 is typically complete.

Figure 6:
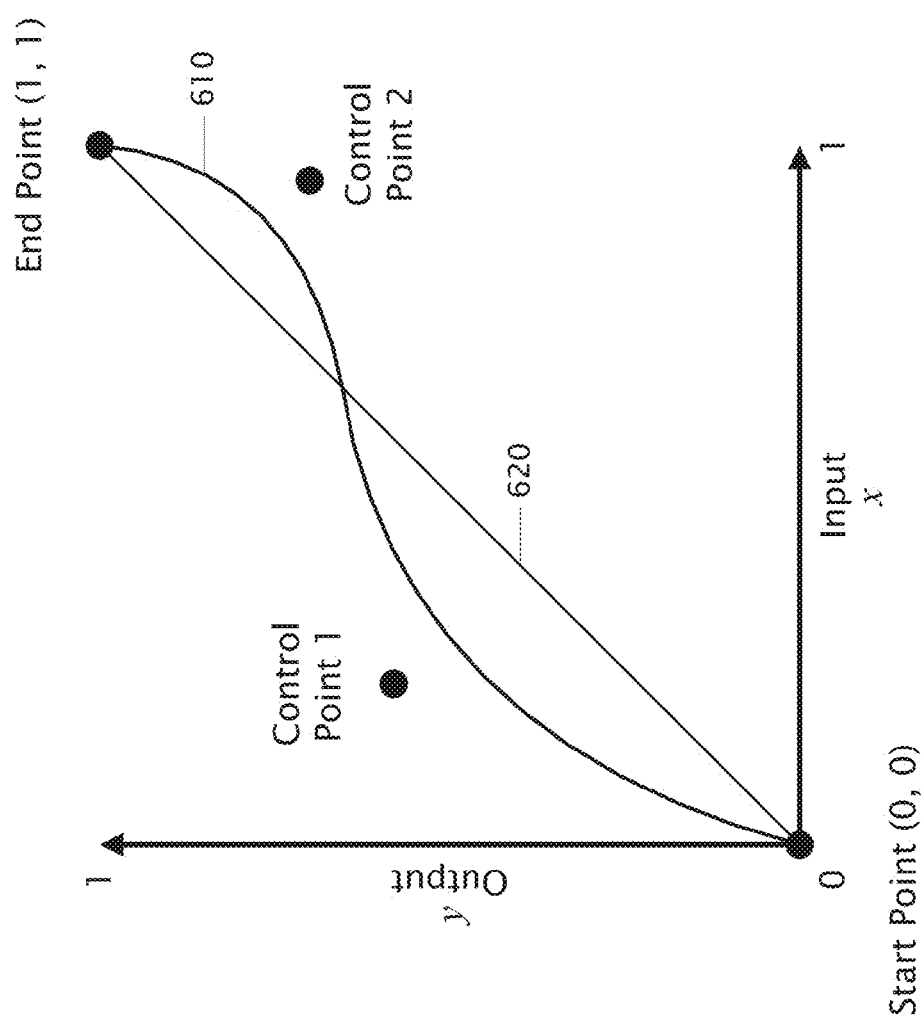
FIG. 6 is a diagram showing an example correction curve.

FIG. 6 is a block diagram showing an example correction curve 610 that begins at start point (0, 0) and ends at end point (1, 1), and that is normalized in a range of 0-1. Straight line 620 between (0, 0) and (1, 1) represents the null correction curve where output values are equal to input values. Example correction curve 610, on the other hand, which is not the null correction curve, can be applied (e.g., step 450) to transform input characteristic data according to the shape of the curve 610. Further, control points 1 and 2 can be manipulated, each in the x and/or the y directions, to further modify the shape of the curve. Such manipulation of control points may take place in at least steps 430 and/or 440. When manipulating a correction curve for the brightness characteristic, for example, moving a control point up (y-axis) tends to brighten the frame image, while moving the control down tends to darken the frame image. Further, moving a control point to the left or right (x-axis) controls whether the darker or brighter portions of the frame are affected by the y-axis movement.

Figure 7:
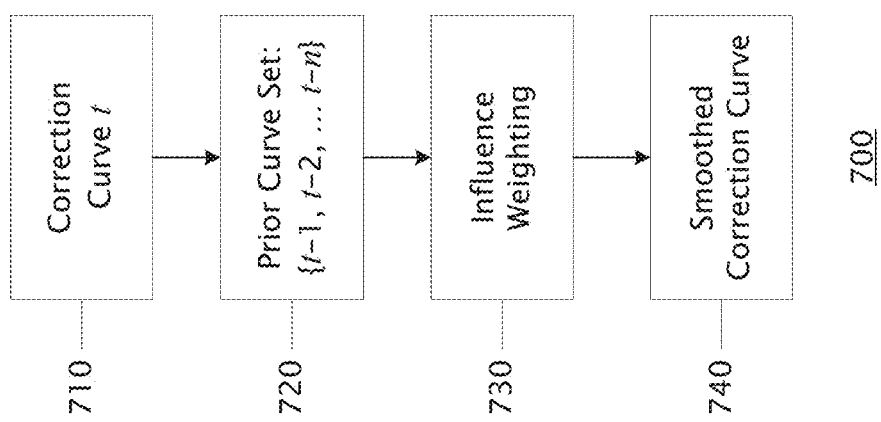
FIG. 7 is a block diagram showing an example method for smoothing the variance of a characteristic of a frame.
Figure 8:
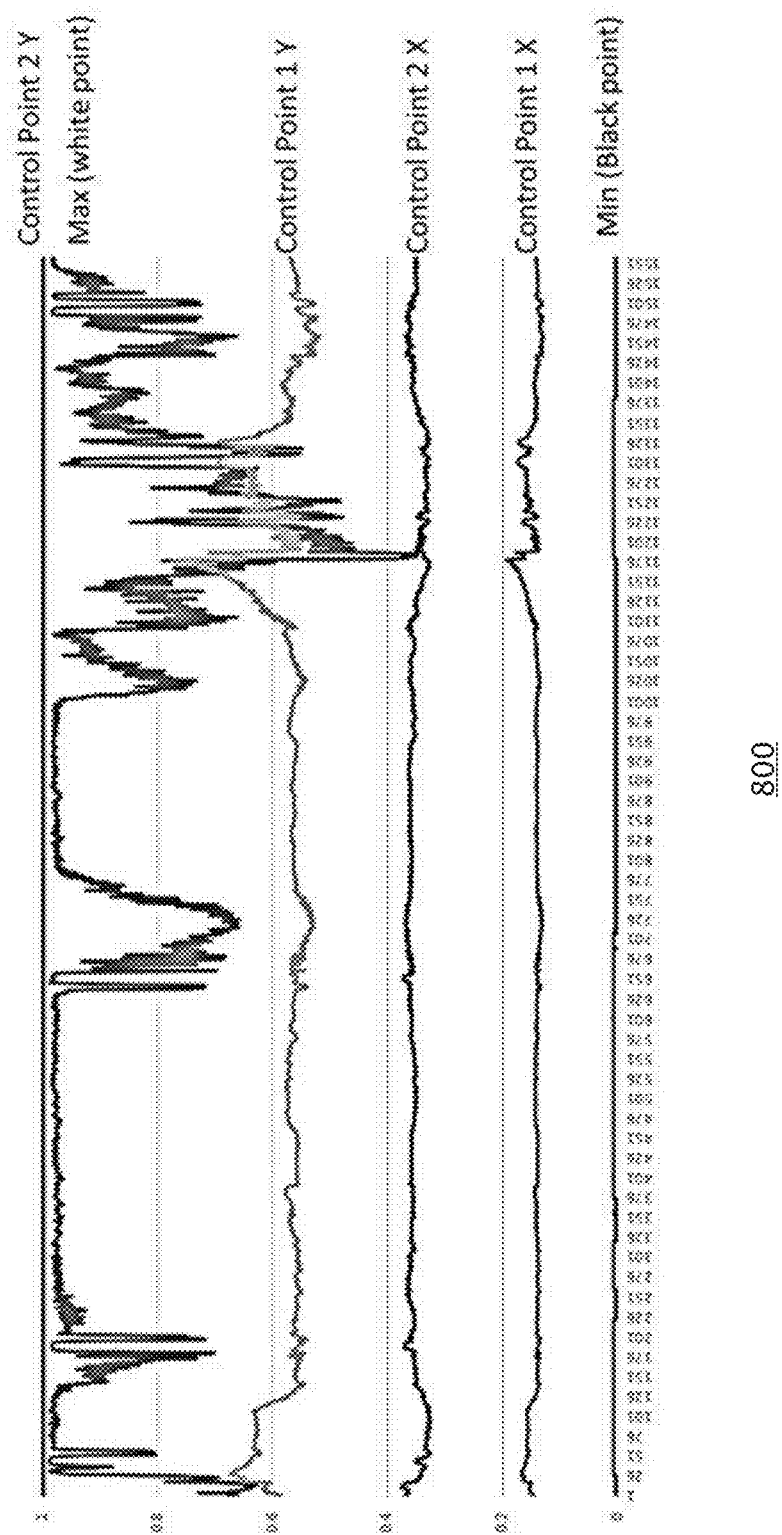
FIG. 8 is an example plot of frames of an example video.

FIG. 7 is a block diagram showing an example method 700 for smoothing the variance of a characteristic value of a frame relative to that characteristic value (and/or other characteristic values) in previously-processed frames of the video. Such a method may be performed by a temporal smoother 360. Considering a brightness characteristic, for example, smoothing may be employed to eliminate or reduce artifacts such as flickering as brightness levels (values) between frames vary abruptly as illustrated in FIG. 8. Such smoothing may comprise influencing the control points of a correction curve of a frame t based on magnitude and direction trends of the correction curves of a set of previous frames {t−1, t−2, . . . t−n}. In one example, n is a relatively small number such as a value between about 4 and 10.

Step 710 typically indicates starting with a correction curve of frame t—the curve to be smoothed. In one example, this curve is the optimal correction curve generated at step 420. In another example, the correction curve has been influenced by user override information according to step 430. Given a correction curve for frame t—the curve to be smoothed, method 700 typically continues at step 720.

Step 720 typically indicates retrieving data for the correction curves of frames {t−1, t−2, . . . t−n} prior to frame t. Such prior correction curve data may be retrieved from store 340 of system 200. In one example, the retrieved data, such as that described in FIG. 8, includes parameter values for the correction curves for each of frames {t−1, t−2, . . . t−n}. Once the prior-frame correction curve data is retrieved, method 700 typically continues at step 730.

Step 730 typically indicates weighting the influence of the correction curve data of each of the prior frames {t−1, t−2, . . . t−n} on the correction curve of frame t—the curve to be smoothed. In one example for single-pass operation, influence weighting for a particular characteristic is set to 50% of the characteristic value for frame t, 25% for frame t−1, 14% for frame t−2, 8% for frame t−3, and 3% for frame t−4. In one example for two-pass operation, influence weighting for a particular characteristic is set to 50% of the characteristic value for frame t, 12.5% for frames t−1 and t+1, 7% for frame t−2 and t+2, 4% for frame t−3 and t+3, and 1.5% for frame t−4 and t+4. In other examples, other number of frames and other influence percentages (weights) may be used. In general, percentages are selected that total 100% and weights assigned to frames closer to frame t are greater than weights assigned to frames farther from frame t. Once the weights have been established, method 700 typically continues at step 740.

Step 740 typically indicates influencing the correction of the characteristic of frame t according to the established weights. In one example, each of the parameters used to establish the shape of a characteristic's correction curve is influenced according to the established weights. One example of such parameters is described in connection with FIG. 8. Such influencing typically results in the smoothed correction curve. Once the smoothed correction curve is generated, method 700 is typically complete.

FIG. 8 is an example plot over approximately 1500 frames of an example video showing value changes for six parameters that shape corrections curves. In this example, the characteristic being corrected is the brightness characteristic. The six parameters and their values for each frame in the plot are:

1. C min values, as computed in step 530, each of which establishes its frame's black point in this example;
2. example x-axis values of control point 1 for each frame;
3. example x-axis values of control point 2 for each frame;
4. example y-axis values of control point 1 for each frame;
5. C max values, as computed in step 530, each of which establishes its frame's white point in this example; and
6. example y-axis values for control point 2 for each frame.

Figure 9:
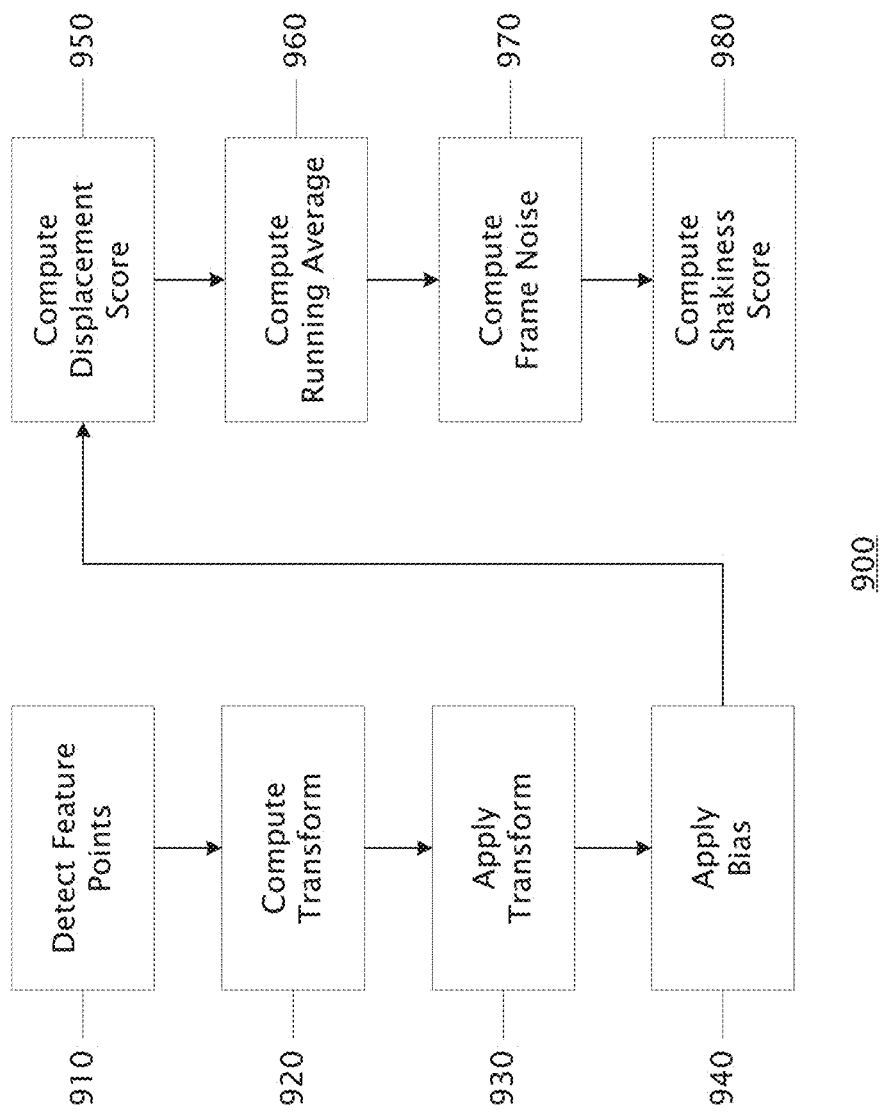
FIG. 9 is a diagram showing an example method 800 for analyzing at least a portion of a video for "shakiness".

FIG. 9 is a diagram showing an example method 900 for analyzing at least a portion of a video for "shakiness", such as over m frames of the video, and for determining a shakiness score for the portion. Such a method may be performed by a shakiness analyzer 230. In one example, method 900 is performed on a computing device, such as describe in connection with FIG. 1, that is controlled according to computer-executable instructions of program modules (e.g., software), such as at least a portion of those described in connection with FIG. 2, that, when executed by the computing device, cause the computing device to perform some or all aspects of method 900. In other examples, the modules described in connection with FIG. 2 may be implemented as firmware, software, hardware, or any combination thereof. Additionally or alternatively, the modules may be implemented as part of a system on a chip ("SoC").

Step 910 typically indicates detecting feature points in two frames of the video t and t+1. Such frames may be consecutive frames, consecutive I-frames, or two other frames. Feature points are detected in each frame. In one example, a luminance channel may be used to detect the feature points. In other examples, characteristics other than or in addition to luminance may be used to detect the feature points. In general, frame t+1 may have been subjected to a 2-dimensional ("2D") or a 3-dimensional ("3D") transformation relative to frame t, such as results from capture device movement between the capture of frames t and t+1. Thus, system 200 attempts to detect feature points in frame t+1 that were previously detected in frame t, thus enabling computation of the transformation between frames t and t+1. Such detection may be based on down-sampled versions of frames t and t+1. Once feature points are detected in each of the frames, method 900 typically continues at step 920.

Step 920 typically indicates computing a transform that can be applied to frame t+1 such that a maximum number of feature points between the two frames t and t+1 coincide. This computed transform typically models any transformation that may have occurred between frames t and t+1. In one example, the computed transform may be expressed in the form of a Homography transformation matrix. Once the transform for a frame is computed, method 900 typically continues at step 930.

Step 930 typically indicates applying the transform to several frame points of frame t+1, where the applying results in a displacement of each of the frame points of frame t+1 relative to frame t. Then a distance of the displacements for each of the frame points is computed. In one example, this distance is a Euclidean distance. The several frame points may be five points that indicate the four corners and center of a frame, where the four corners form a rectangle. Once the transform is applied and a frame's displacement distances are computed, method 900 typically continues at step 940.

Step 940 typically indicates optionally biasing, based on relative importance, each of the displacement distances of frame t+1 computed in step 930. In one example, for each distance, the biasing is accomplished by multiplying the displacement distance with a weight that corresponds to its point's importance relative to the other points. In the example where the several frame points are five points of a rectangle, the distance of the center point may be biased as more important than the corners. Once a frame's displacement distances are biased, method 900 typically continues at step 950.

Step 950 typically indicates computing a displacement score Di for frame t+1 relative to frame t. In one example, the score is computed by adding all of the biased distance values calculated in step 940. Once the displacement score for a frame is computed, method 900 typically continues at step 960.

Step 960 typically indicates computing a running average displacement score Davg for all of the m frames of the video processed so far. In one example, the running average displacement score Davg is based on the individual displacement scores of previous frames. This value—Davg—generally represents long-term relative motion between the capture device and the scene that is considered "intentional motion", such as panning, zooming, movement in the scene, and the like, where the scene is what is captured in the video frames. Once the running average has been computed, method 900 typically continues at step 970.

Step 970 typically indicates computing the shakiness noise Dnoise for frame t+1. In one example, Dnoise is computed as the difference between the frame's displacement score Di from the running average displacement score Davg. This value—Dnoise—generally represents "shakiness" or unintended short-term noise in the relative motion between the capture device and the scene, as opposed to intended motion.

Once shakiness noise Dnoise is computed for frame t+1, steps 910 through 970 are typically repeated for any next frame t+2 in the m frames of the video being analyzed for shakiness. In general, frame t+1 of step 970 becomes frame t for repeated step 910, and any next frame t+2 becomes frame t+1 for repeated step 910. If there is no next frame t+2 in the portion of the video being analyzed, then method 900 typically continues at step 980.

Once the portion of the video has been analyzed, step 980 typically indicates calculating an average shakiness value for the portion from each of the Dnoise values computed in step 970. Then the average shakiness value is compared to a threshold. In one example, if the average shakiness exceeds the threshold, then the video is automatically stabilized. In another example, if the average shakiness exceeds a threshold, then a recommendation is made that the video be stabilized. Once step 980 is complete, then method 900 is typically complete.

In view of the many possible embodiments to which the invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method performed on a computing device, the method for enhancing quality of a series of frames, the method comprising:
   decoding, by the computing device, a frame of the series of frames;
   deriving, by the computing device from the decoded frame, data for a characteristic of the frame;
   generating, by the computing device, correction parameters based on an integral of a variation of the derived data; and
   smoothing, by the computing device, the characteristic, where the smoothing comprises adjusting the generated correction parameters based on correction parameters of other decoded frames of the series of frames, where the other decoded frames, if any, are located prior to the decoded frame in the series.

2. The method of claim 1 further comprising:
   generating a histogram from the derived data;
   computing min and max characteristic values from the histogram;
   computing new data based on the histogram and on the min and max characteristic values, where the new data is bounded by the min and max characteristic values; and
   generating an integral histogram based on the new data.

3. The method of claim 1 where the correction parameters are embodied in a look-up table.

4. The method of claim 1 further comprising performing the method on each frame in the series.

5. The method of claim 4, where the each frame in the series is decoded no more than once in performance of the method.

6. The method of claim 1 where the smoothing comprises weighting each of the correction parameters of the other decoded frames.

7. The method of claim 1 where the smoothing further comprises influencing the correction parameters based on the weighted correction parameters of the other decoded frames.

8. A computing device comprising:
   a processor;
   memory coupled to the processor and that comprises a frame of the series of frames;
   a frame decoder implemented at least in part by electronic hardware and via which the computing device decodes the frame;
   the computing device configured to derive, from the decoded frame, data for a characteristic of the frame;
   a frame analyzer implemented at least in part by electronic hardware and via which the computing device generates correction parameters based on an integral of a variation of the derived data; and
   a frame corrector implemented at least in part by electronic hardware and via which the computing device smoothes the characteristic, where the characteristic is smoothed based on adjusting the generated correction parameters based on correction parameters of other decoded frames of the series of frames, where the other decoded frames, if any, are located prior to the decoded frame in the series.

9. The computing device of claim 8 further configured to:
   generate a histogram from the derived data;
   compute min and max characteristic values from the histogram;
   compute new data based on the histogram and on the min and mar characteristic values, where the new data is bounded by the min and max characteristic values; and
   generate an integral histogram based on the new data.

10. The computing device of claim 8 where the correction parameters are embodied in a look-up table.

11. The computing device of claim 8 further configured to process each frame in the series as the frame.

12. The computing device of claim 11, where the each frame in the series is decoded no more than once in performance of the method.

13. The computing device of claim 8 where the smoothing comprises weighting each of the correction parameters of the other decoded frames.

14. The computing device of claim 8 where the smoothing further comprises influencing the correction parameters based on the weighted correction parameters of the other decoded frames.

15. At least one computer-readable medium that is not a signal or carrier wave per se and that comprises computer-executable instructions that, based on execution by a computing device, configure the computing device to perform actions for enhancing quality of a series of frames, the actions comprising:
   decoding, by the computing device, a frame of the series of frames;
   deriving, by the computing device from the decoded frame, data for a characteristic of the frame;
   generating, by the computing device, correction parameters based on an integral of a variation of the derived data; and
   smoothing, by the computing device, the characteristic, where the smoothing comprises adjusting the generated correction parameters based on correction parameters of other decoded frames of the series of frames, where the other decoded frames, if any, are located prior to the decoded frame in the series.

16. The at least one computer-readable medium of claim 15, the actions further comprising:
generating a histogram from the derived data;
computing min and max characteristic values from the histogram;
computing new data based on the histogram and on the min and max characteristic values, where the new data is bounded by the min and max characteristic values; and
generating an integral histogram based on the new data.

17. The at least one computer-readable medium of claim 15 where the correction parameters are embodied in a look-up table.

18. The at least one computer-readable medium of claim 15, the actions further comprising performing the method on each frame in the series.

19. The at least one computer-readable medium of claim 18, where the each frame in the series is decoded no more than once in performance of the method.

20. The at least one computer-readable medium of claim 15 where the smoothing comprises weighting each of the correction parameters of the other decoded frames, and where the smoothing further comprises influencing the correction parameters based on the weighted correction parameters of the other decoded frames.

* * * * *